(12) United States Patent
Barendrecht

(10) Patent No.: US 12,348,111 B2
(45) Date of Patent: Jul. 1, 2025

(54) DEVICE FOR DRIVING ROTATION OR TRANSLATION OF A SHAFT FOR A MACHINE TOOL OR WHEELED VEHICLE

(71) Applicant: FRANCE REDUCTEURS, Les Herbiers (FR)

(72) Inventor: Wouter Barendrecht, Cholet (FR)

(73) Assignee: FRANCE REDUCTEURS, Les Herbiers (FR)

(\*) Notice: Subject to any disclaimer, the term of this patent is extended or adjusted under 35 U.S.C. 154(b) by 251 days.

(21) Appl. No.: 18/027,891

(22) PCT Filed: Sep. 30, 2021

(86) PCT No.: PCT/FR2021/051696
§ 371 (c)(1),
(2) Date: Mar. 22, 2023

(87) PCT Pub. No.: WO2022/069841
PCT Pub. Date: Apr. 7, 2022

(65) Prior Publication Data
US 2023/0336050 A1 Oct. 19, 2023

(30) Foreign Application Priority Data
Oct. 2, 2020 (FR) ..................................... 20 10107

(51) Int. Cl.
| | |
|---|---|
| *H02K 7/14* | (2006.01) |
| *H02K 1/28* | (2006.01) |
| *H02K 7/00* | (2006.01) |
| *H02K 11/21* | (2016.01) |

(52) U.S. Cl.
CPC ............... *H02K 7/003* (2013.01); *H02K 1/28* (2013.01); *H02K 7/14* (2013.01); *H02K 11/21* (2016.01)

(58) Field of Classification Search
CPC . H02K 7/06; H02K 11/21; H02K 1/28; H02K 7/003; H02K 7/14; H02K 7/07; H02K 7/10
USPC .................................................. 310/75 R, 80
See application file for complete search history.

(56) References Cited

U.S. PATENT DOCUMENTS

| | | | |
|---|---|---|---|
| 6,531,798 B1 \* | 3/2003 | Palmero ................. | H02K 16/00 310/12.32 |
| 2003/0173868 A1 | 9/2003 | Quarre | |
| 2005/0147704 A1 \* | 7/2005 | Ickinger .............. | B29C 45/5008 425/149 |

(Continued)

OTHER PUBLICATIONS

International Search Report dated Jan. 13, 2022.
International Search Report dated Jun. 14, 2021.

*Primary Examiner* — Alexander A Singh
(74) *Attorney, Agent, or Firm* — IPSILON USA, LLP

(57) ABSTRACT

Disclosed is a device (1) for driving either rotation or translation of a shaft (2). It comprises an electric motor (3) that comprises a stator (4) and a single rotor (5) supporting the shaft (capable of being turned in two directions). Through an activatable/deactivatable system (9) which engages or disengages at least one element (71, 72), the device (1) is either in the first configuration for rotation of the shaft (2) or in the second configuration for a relative axial movement between shaft and static portions of the device (1). The single rotor (5) is a versatile rotor through selection between the first configuration or the second configuration.

15 Claims, 13 Drawing Sheets

(56) References Cited

U.S. PATENT DOCUMENTS

| | | | |
|---|---|---|---|
| 2008/0127757 A1* | 6/2008 | Eberlein | H02K 16/02 74/25 |
| 2008/0309179 A1 | 12/2008 | Eberlein et al. | |
| 2015/0013483 A1 | 1/2015 | Schwarzbach et al. | |
| 2019/0275622 A1 | 9/2019 | Norum | |

* cited by examiner

DEVICE FOR DRIVING ROTATION OR TRANSLATION OF A SHAFT FOR A MACHINE TOOL OR WHEELED VEHICLE

RELATED APPLICATION

This application is a National Phase of PCT/FR2021/051696 filed on Sep. 30, 2021, which claims the benefit of priority from French Patent Application No. 20 10107, Oct. 2, 2020, the entirety of which are incorporated by reference.

FIELD OF THE INVENTION

The present invention concerns a device for driving rotation of at least one shaft, a power tool, and a mobile machine equipped with such a device.

It concerns in particular a device for driving rotation of at least one shaft, this driving device comprising in addition to said shaft an electric motor comprising a stator and a single rotor with two senses of rotation, the rotor for driving rotation of said shaft having said shaft passed through it.

PRIOR ART

Numerous devices for driving rotation of a shaft used for diverse and varied applications are commercially available. These driving devices are characterized by their complexity. They necessitate two rotors and two stators to obtain rotary movement and axial displacement of a shaft. Such is the case for example of the documents US 2015/013483 or WO 2018/055196 or US 2008/309179 or indeed CN1 037 293. The manufacturers of such devices are continually seeking solutions enabling these driving devices to be rendered more versatile without compromising the simplicity and the capacity of such devices.

OBJECTS AND SUMMARY

One object of the invention is to propose a device of the aforementioned type the design of which provides a simple way of obtaining a more versatile device.

To this end, the invention has for object a device for driving rotation of at least one shaft, this driving device comprising in addition to said shaft an electric motor comprising a stator and single rotor with two senses of rotation, the rotor for driving rotation of said shaft having said shaft passed through it, characterized in that the device has:
  a first configuration in which the shaft and the stator are disposed with the one disposed axially fixed relative to the other when the rotor is driven in rotation, and
  a second configuration in which, as a function of the rotation movement of the rotor, the shaft and the stator are mounted so as to be the one mobile axially relative to the other in a direction parallel to the longitudinal axis of the shaft to pass from one axial relative position between the stator and the shaft to another axial relative position between the stator and the shaft, each axial relative position between the stator and the shaft being a stable position, in that said first and second configurations are selectively activatable and in that the rotor is a versatile rotor with the function of a drive unit driving rotation of said shaft in the first configuration and the function of a drive unit driving axial relative displacement of the shaft and of the stator in the second configuration, said axial relative displacement being a function of the sense of rotation of the rotor. It must be noted that the expression stable position is the opposite of the expression unstable position. A stable position in the sense of the invention is a position that can be maintained after the motor is stopped with said device not supplied with electricity. Conversely, an unstable position is a position that cannot be maintained when the device is not supplied with electricity. Such a device for driving rotation of a shaft therefore has a second configuration in which the shaft and the stator are mobile axially the one relative to the other in a direction parallel to the longitudinal axis of the shaft as a function of the rotation movement of the rotor, that is to say through the action of the rotation of said rotor. In this second configuration driving rotation of the rotor enables axial relative displacement of the stator and of the shaft, the sense of the axial relative displacement being a function of the sense of rotation of the rotor. Thus rotation of the rotor in a first sense of rotation causes relative axial displacement of the shaft and of the stator in a first sense while rotation of the rotor in a second sense opposite the first sense causes axial relative displacement of the shaft and of the stator in a second sense opposite said first sense. Conversely, in the first configuration the shaft and the stator are, independently of any rotation movement of the shaft, that is to say with rotation of the shaft driven and with rotation of the shaft not driven, disposed axially fixed relative the one relative to the other. Thus rotation of the shaft and likewise axial displacement of the shaft can be driven by driving rotation of the rotor, which is therefore versatile. The sense of the rotation, the duration of operation and the angular range of displacement of the rotor therefore drive the axial relative movement of the shaft and the rotor stator. This results in simplicity of the device in which, in all configurations, the rotor forms the drive unit driving the relative rotation of the shaft and of the rotor and/or the relative displacement of the shaft and of the stator, that is to say impacts said displacement as a function of the sense of its rotation, its speed and its operating time.

In accordance with one embodiment of the invention, the device comprises at least one element threaded onto the shaft, this rotary element being mounted so as to be constrained to rotate with the shaft at least in the first configuration and mounted so as to be fixed in rotation in the second configuration and the shaft and the element are mounted so as to be mobile axially the one relative to the other in the second configuration. Constraining the element and the shaft to rotate together may be achieved by bolting the element onto the shaft or by cooperation of complementary shapes of the shaft and of the element or by any other means.

In accordance with one embodiment of the invention, the device comprises an activatable/deactivatable system for immobilizing said element in rotation relative to the stator, the first configuration of the device corresponds to the configuration in which the activatable/deactivatable system for immobilizing the element in rotation is in the deactivated state, and the second configuration of the device corresponds to the configuration in which the activatable/deactivatable system for immobilizing the element in rotation is in the activated state. Thus the device is configured to pass from the first configuration to the second configuration by activation of the activatable/deactivatable system for immobilizing the element in rotation and from the second configuration to the first configuration by deactivation of the activatable/deactivatable system for immobilizing the element in rotation. This results in a simplicity of functioning of the device. The axial relative displacement between the shaft and the stator in the second configuration is obtained by rotation of the rotor in association with activation of the activatable/deactivatable system for immobilizing the element in rotation. In other words, in the activated state of the activatable/deactivatable system for immobilizing the element in rotation the axial relative displacement between the shaft and the stator in the second configuration is obtained by driving rotation of the rotor.

In accordance with one embodiment of the invention, the activatable/deactivatable system for immobilizing the element in rotation comprises at least a part constrained to rotate with the element and a part independent of the element, said parts being mounted so as to be mobile in the sense of movement of the one closer to or farther from the other and in a position with the one closer to the other in the activated state of the activatable/deactivatable system for immobilizing the element in rotation. Said parts therefore form in the closer together position a means for immobilizing the element in rotation. The part of the activatable/deactivatable system for immobilizing the element in rotation that is independent of the element is generally carried by the stator, in particular for reasons of compactness. This part of the activatable/deactivatable system for immobilizing the element in rotation independent of the element and therefore distinct from the element is preferably mounted on the stator so as to be fixed in rotation.

In accordance with one embodiment of the invention, the activatable/deactivatable system for immobilizing the element in rotation is an electromagnetic system comprising at least a coil and an armature or a core. The coil and the armature or the core are generally formed, the one by the activatable/deactivatable system for immobilizing in rotation the element that is constrained to rotate with the element, the other by the part of the activatable/deactivatable system for immobilizing the element in rotation that is independent of the element, this independent part preferably being carried by the stator. Said parts are therefore mobile in the sense of movement of the one toward the other in the energized state of the coil. The part of the activatable/deactivatable system for immobilizing the element in rotation independent of the element is generally mounted on the device so as to be fixed in rotation relative to the stator.

In accordance with one embodiment of the invention, the element and/or the rotor comprise(s) an internal thread permanently interengaged with a part of the shaft. This part of the shaft with which the internal thread of the element and/or of the rotor is permanently interengaged may be an external thread on the shaft or a radial projection on the shaft. This radial projection may be formed in one piece with the body of the shaft or be mounted on said body of the shaft. The advantage of a radial projection it is that it is simpler to produce compared to an external thread.

In accordance with one embodiment of the invention, in which the rotor comprises an internal thread permanently interengaged with a part of the shaft, the element is mounted so as to be constrained to rotate with the rotor in a first configuration and the element, with the shaft, is fixed in rotation relative to the rotor in the second configuration. It must be noted that in the second configuration, in which the shaft and the stator are in axial relative displacement, the shaft does not turn relative to the stator during said axial displacement. Thus in the second configuration the shaft and the stator are mobile axially the one relative to the other and the shaft is fixed in rotation relative to the stator and to the rotor when rotation of the rotor is driven. The element and the shaft are permanently interengaged either directly or indirectly so as to constrain them to rotate together.

In accordance with one embodiment of the invention, the element takes the form of a ring with one face facing the rotor, this face featuring projecting or recessed parts adapted to cooperate with parts of complementary shape of the rotor to constrain the element and the rotor to rotate together in the first configuration, this element being mounted so as to be mobile axially relative to the rotor on passage of the activatable/deactivatable system for immobilizing the element in rotation from the deactivated state to the activated state. This disposition makes it possible to prevent accidental unscrewing of the shaft from the rotor in the first configuration. Thus the angular position of the shaft and of the rotor is reliably maintained and precise axial relative displacement of the shaft and of the stator may be driven in the second configuration. The fact that the element is mobile axially in the sense of moving farther from or closer to the rotor during the passage of the activatable/deactivatable system for immobilizing the element in rotation from the deactivated state to the activated state allows independent rotation of the rotor and of the shaft in the second configuration. The projecting or recessed parts of the rotor and of the element do not cooperate in the second configuration.

In accordance with one embodiment of the invention, in which the element comprises an internal thread permanently interengaged with a part of the shaft, the rotor and the shaft are permanently interengaged either directly or indirectly so as to be mounted so as to be constrained to rotate together and free for axial displacement and the element is mounted so as to be axially fixed relative to stator in a direction parallel to the longitudinal axis of the shaft. It must be noted that in the second configuration, in which the shaft and the stator are in axial relative displacement, the shaft turns relative to the stator during said axial displacement. Thus in the second configuration the shaft and the stator are mobile axially the one relative to the other and the shaft is mobile in rotation relative to the stator and constrained to rotate with the rotor when rotation of the rotor is driven.

In accordance with one embodiment of the invention, the element is a so-called braked nut equipped with a brake acting continuously on the nut. The brake is configured to oppose accidental unscrewing of the nut. In fact, the brake is active by constriction to prevent accidental unscrewing of the nut from the shaft. Thus the axial position of the shaft is reliably maintained and precise axial relative displacement of the shaft may be driven. Thus the brake is configured to increase the forces between the external thread of the bolt and the internal thread of the nut. This brake enables a resisting torque to be created between the external thread of the bolt and the internal thread of the nut. This resisting torque makes it possible to limit the risks of accidental unscrewing of the nut. The activatable/deactivatable system for immobilizing the nut in rotation is for its part, in the activated state, configured to generate a force for immobilizing the nut in rotation greater than the forces between the external thread of the bolt and the internal thread of the nut to enable the nut and the shaft not to be constrained to rotate together. Because of the design of the nut whereby it can be immobilized in rotation, said nut and the shaft are constrained to rotate together in the first configuration and are not constrained to rotate together in the second configuration and so the shaft is able to turn independently of the nut in the second configuration.

In accordance with one embodiment of the invention, the device comprises one or more end-of-travel abutments for the axial relative movement of the shaft and of the stator. These end-of-travel abutments are mechanical abutments. In the state with an abutment loaded, a rise in current also known as a current peak may be detected.

In accordance with one embodiment of the invention, the device comprising a plurality of, namely at least two, end-of-travel abutments for the axial relative movement of the shaft and of the stator, said abutments are selectively activatable as a function of the sense of rotation of the rotor.

In accordance with one embodiment of the invention, the device comprises at least one sensor for detecting the angular position of the rotor and a control unit of the rotor, the control unit is configured to acquire the data supplied by the sensor or sensors for detecting the angular position of the rotor and to drive the rotor with a view to predetermined axial relative positioning of the shaft and of the stator as a function at least of the data supplied by the sensor or sensors for detecting the angular position of the rotor. The at least one sensor for detecting the angular position of the rotor is generally carried by the stator and may consist of a set of Hall effect sensors provided on the stator to detect the angular position of the rotor. The sensors for detecting the angular position of the rotor are therefore versatile and also enable information to be supplied to the control unit of the rotor to drive axial relative displacement of the shaft and of the stator. The control unit is further configured to acquire data relating to the current drawn by the motor and to halt the axial displacement of the shaft as a function of the data provided. Thus in the loaded state of an abutment an increase in current also known as current peak can be detected by the control unit and the control unit is configured to halt the axial displacement as a function of the data provided.

In accordance with one embodiment of the invention, the device comprises a working tool and the working tool is coupled to the rotor or to the shaft of said device. The working tool may be a cutting tool, such as a lawnmower blade.

The invention further has for object a mobile machine comprising a device for driving rotation of a shaft, characterized in that the device for driving rotation of a shaft, which comprises a working tool coupled to the rotor or to the shaft of said device, is of the aforementioned type. The mobile machine may be a lawnmower and the working tool a lawnmower blade so that in the second configuration the device serves as a device for adjusting the cutting height.

The invention further has for object a working machine comprising a device for driving rotation of a shaft, characterized in that the device for driving rotation of a shaft, which comprises a working tool coupled to the rotor or to the shaft of said device, is of the aforementioned type.

BRIEF DESCRIPTION OF THE DRAWINGS

The invention will be better understood on reading the following description of embodiments with reference to the appended drawings, in which.

DETAILED DESCRIPTION

Figure 1:
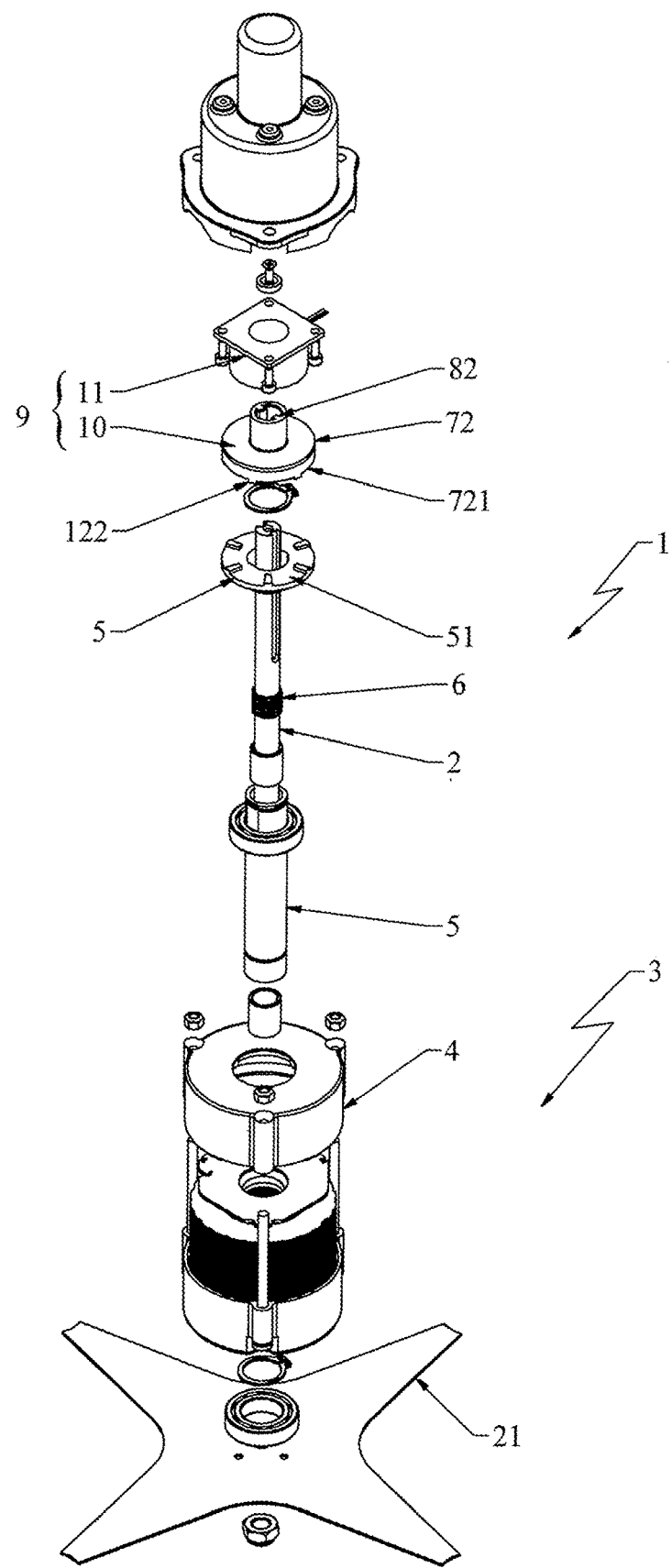
FIG. 1 represents a perspective exploded view of the components of a device for driving rotation of at least one shaft.
Figure 2:
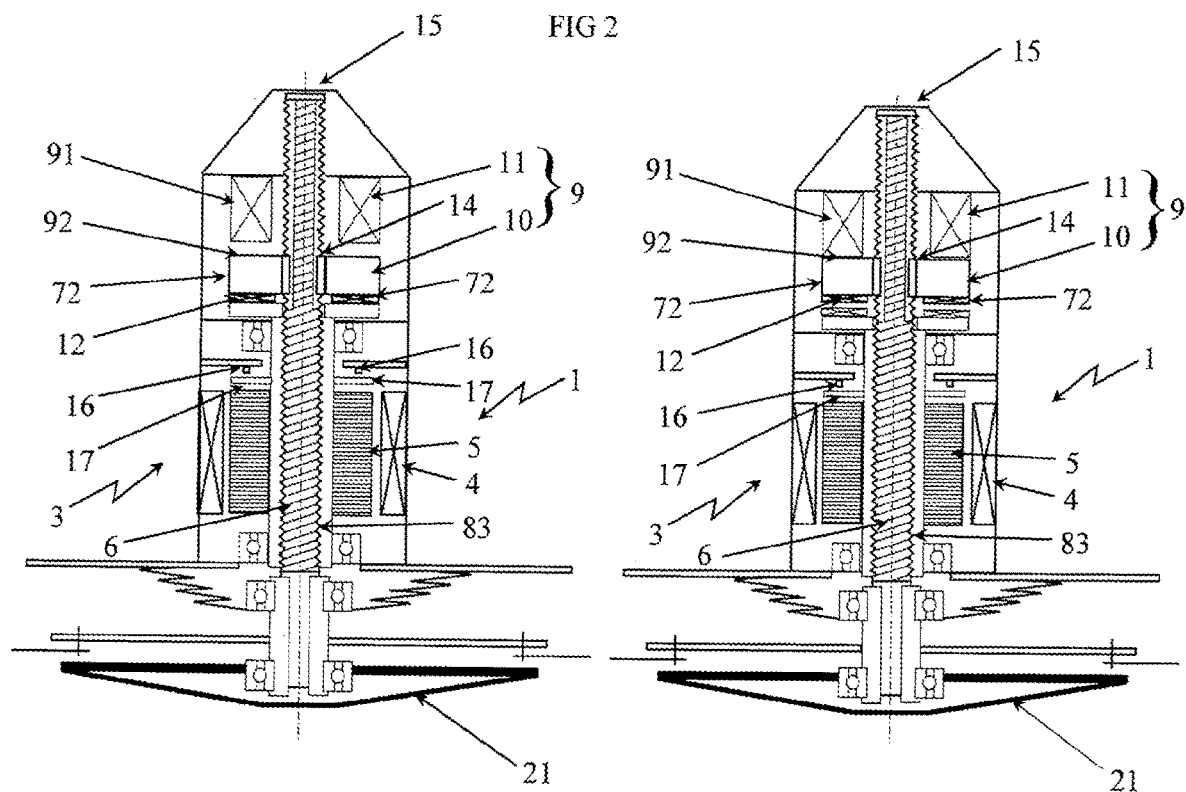
FIG. 2 represents in the form of sectional views of the device for driving rotation of at least one shaft from FIG. 1 the various configurations of the device and the axial relative positions of the shaft and of the stator in the various configurations.
Figure 2:
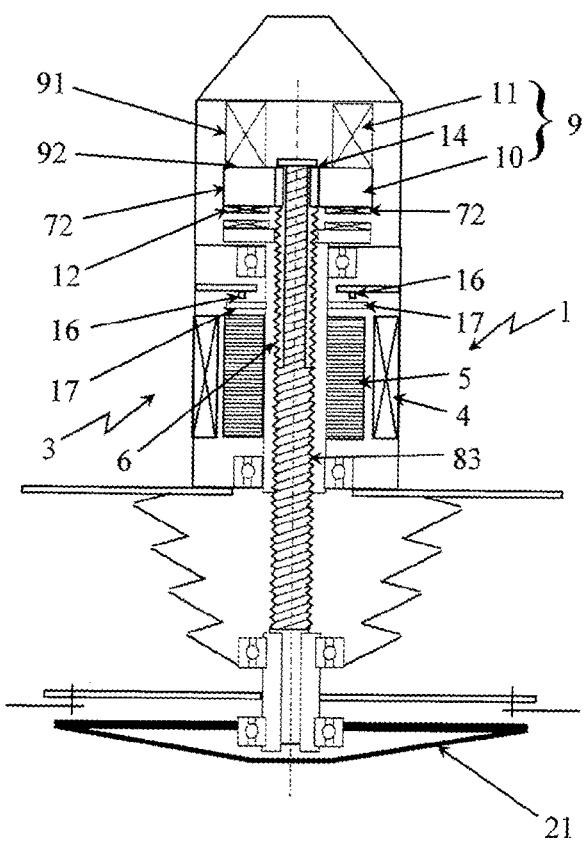
Figure 3:
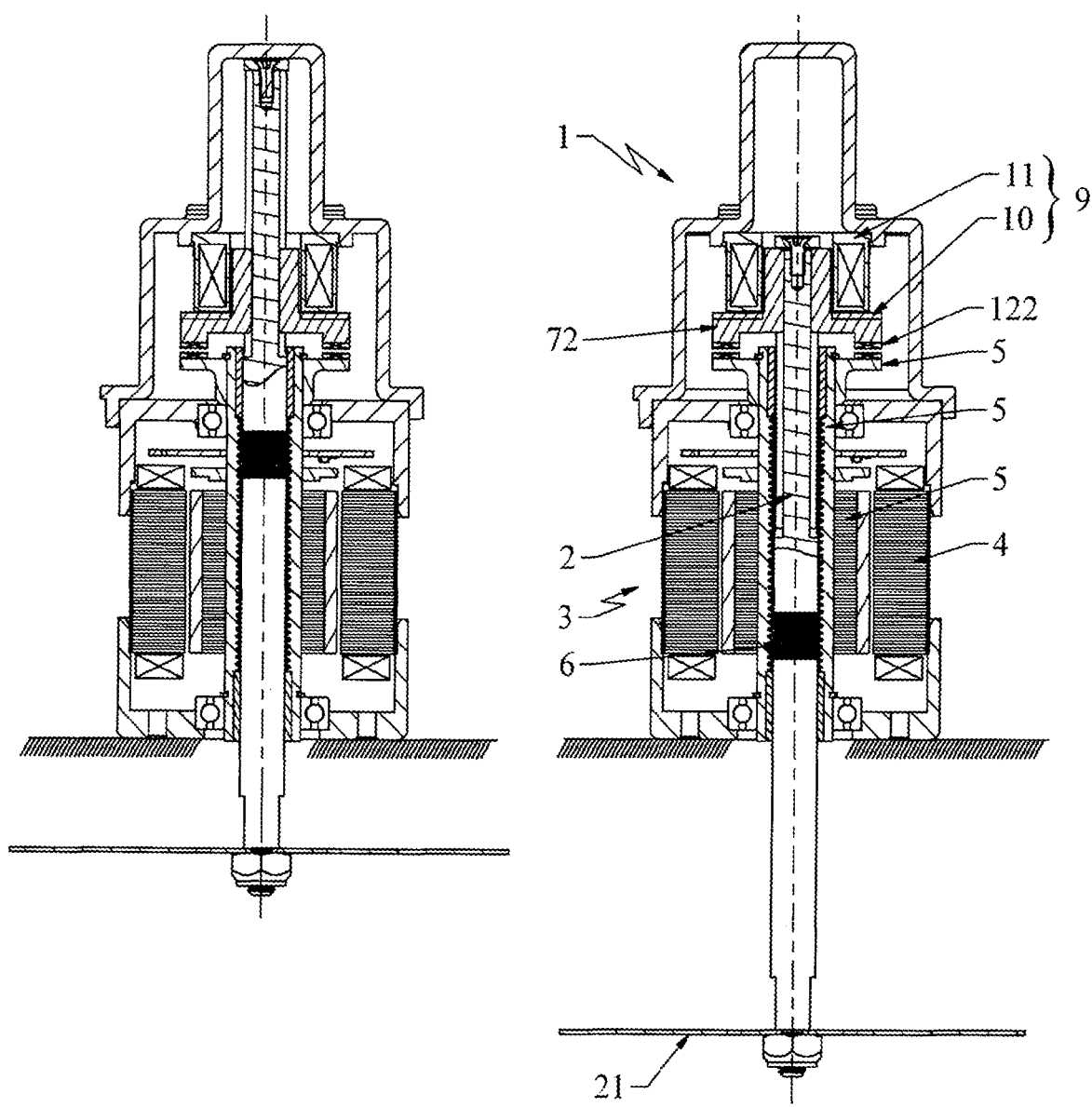
FIG. 3 represents two sectional views of the device for driving rotation of at least one shaft from FIG. 1 in the second configuration in two axial relative positions of the shaft and of the stator.
Figure 4:
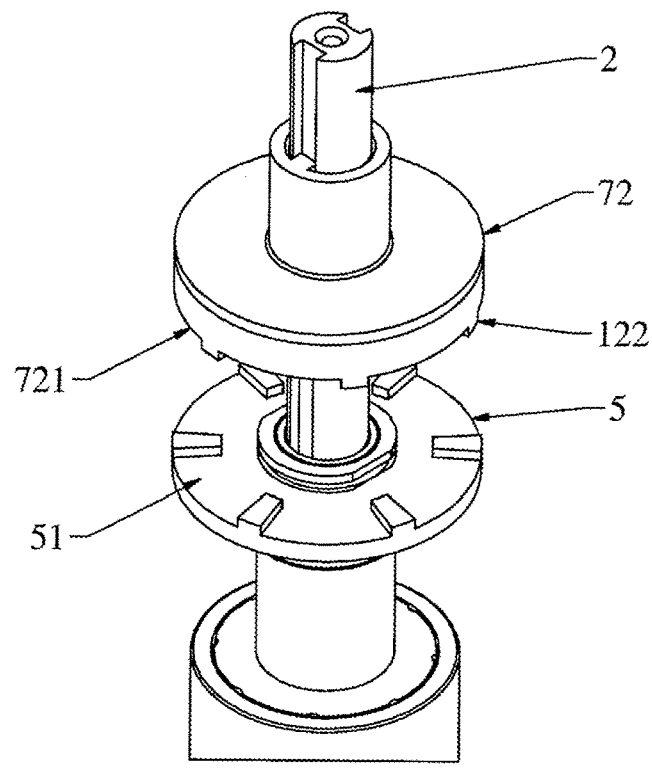
FIG. 4 represents a partial perspective view of the elements in the form of a ring, of the rotor and of the shaft to illustrate the possible coming into interengagement of the element with the rotor.
Figure 5:
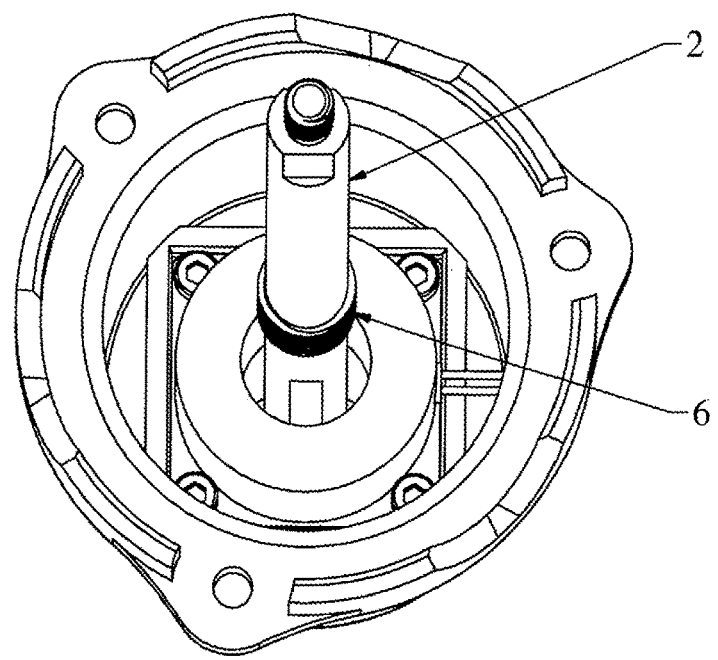
FIG. 5 represents a partial perspective view of the element in the form of a ring, of the rotor and of the shaft.
Figure 6:
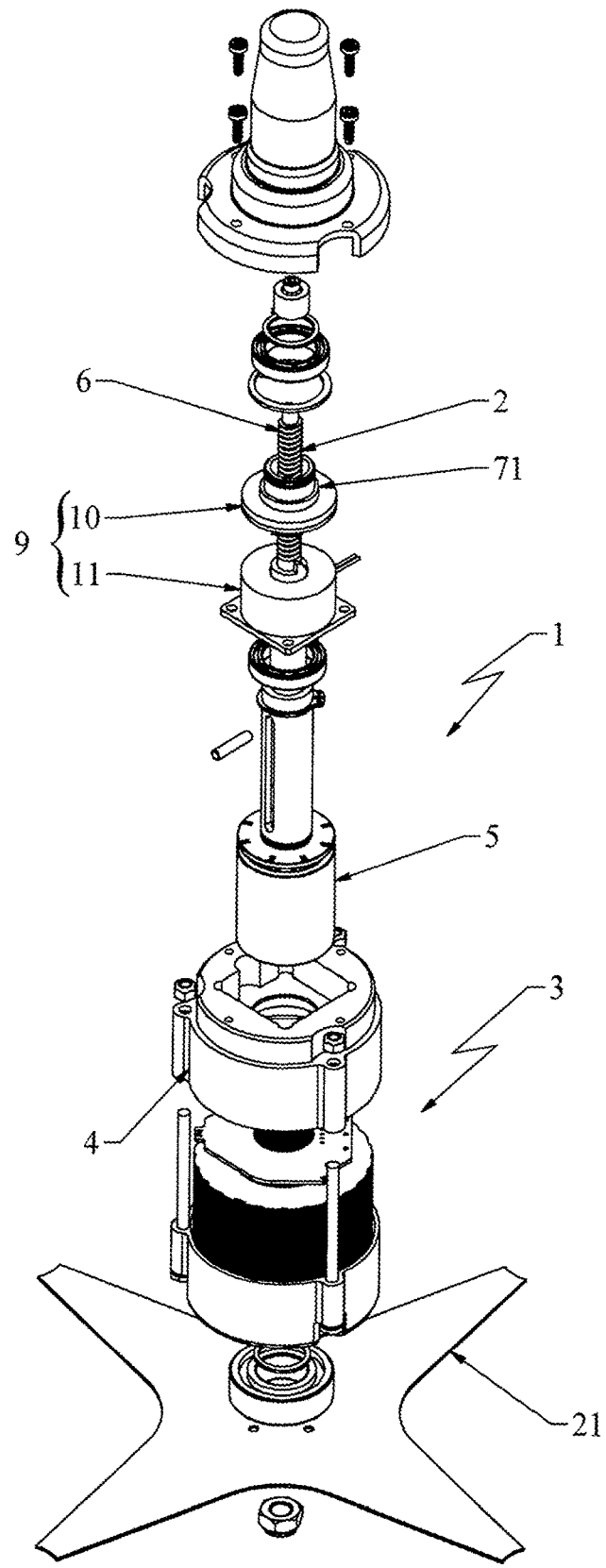
FIG. 6 represents a perspective exploded view of the components of a device according to the invention for driving rotation of at least one shaft.
Figure 7:
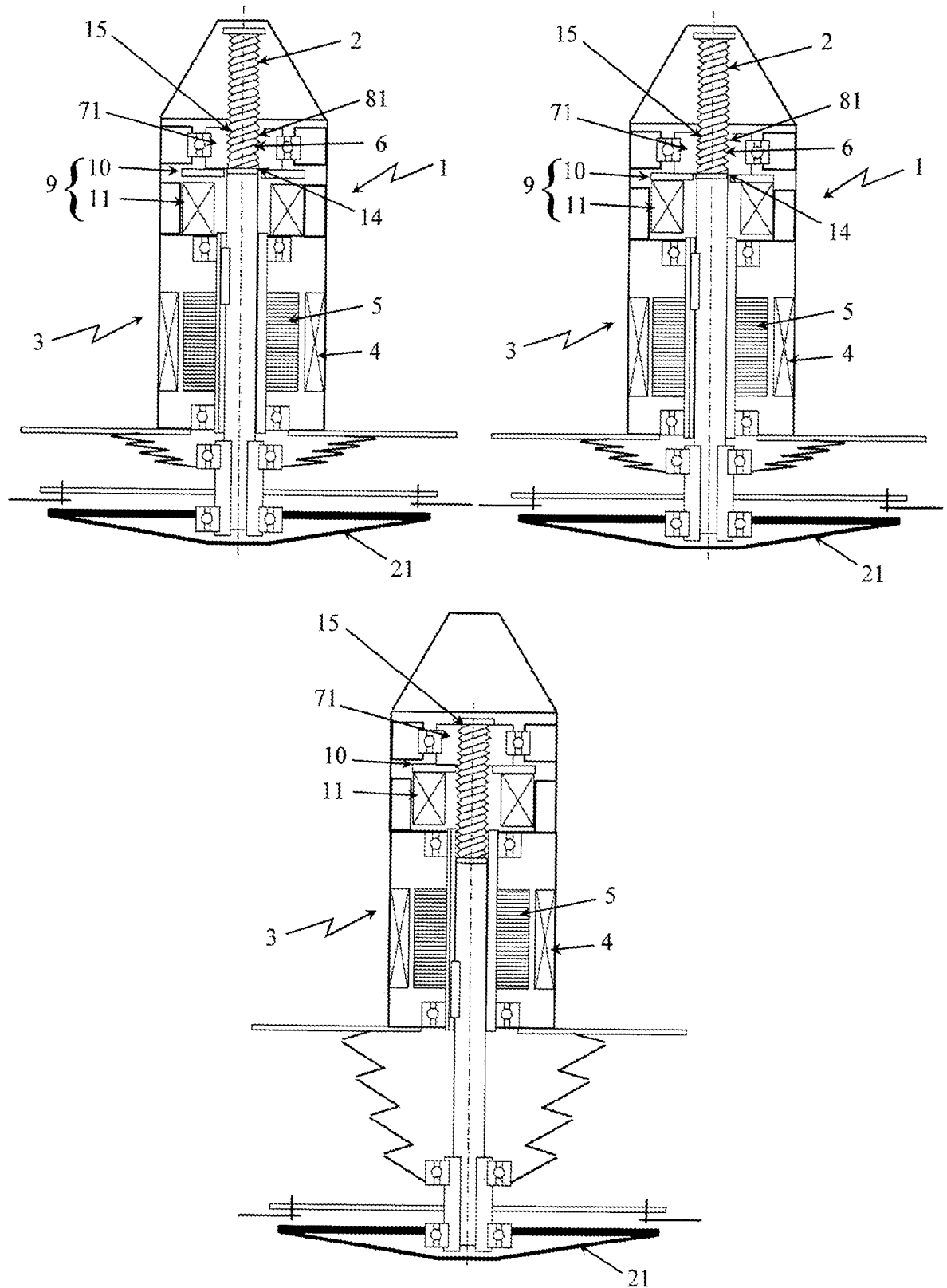
FIG. 7 represents in the form of sectional views of the device for driving rotation of at least one shaft from FIG. 6 the various configurations of the device and the axial relative positions of the shaft and of the stator in the various configurations.

As mentioned hereinabove, the invention has for object a device 1 for driving rotation of at least one shaft 2 intended to be equipped with a working tool 21, as depicted in the figures. This working tool 21 may be a cutting tool or a drilling tool or some other tool. As depicted for example in FIGS. 1 and 6 this rotation driving device 1 comprises in addition to said shaft 2 an electric motor 3. This electric motor 3 comprises a stator 4 and a rotor 5 with two senses of rotation. This rotor 5 is centrally hollowed out to delimit a through passage for said shaft 2 which forms the drive shaft of said electric motor 3. The through passage of this motor may be internally threaded as depicted in FIG. 2, the internal thread being represented at 83, or smooth, as depicted in FIG. 7.

The rotor 5 is generally formed by stacked plates and magnets disposed close to the periphery of the rotor in order to be attracted by a rotating magnetic field generated at the level of the stator. The stator 4 is disposed around the rotor 5.

In each of the examples represented the rotor 5 also comprises internally a sleeve or tube delimiting this through passage. The sleeve or tube is surrounded by the stacked plates forming with the sleeve and the magnets an assembly of units that are constrained to rotate together.

The stator 4 is for its part formed of plates interacting with a coil to form an electromagnetic part and a stator frame at least partly enveloping the electromagnetic part of the stator 4 and the rotor in a manner known in itself. The casing of this stator frame features at least one opening from which the shaft 2 projects. This stator frame, which surrounds the rotor, the stator and at least part of the shaft, may also delimit one or more cavities accommodating components of the rotation driving device 1 that will be described hereinafter. The rotor 5 is a rotor with two senses of rotation able to turn in the clockwise sense and in the anticlockwise sense.

The electric motor 3 comprising the stator 4 and the rotor 5 may be a direct current motor or an alternating current motor. This motor may be of the brushless type.

The stator 4 and the rotor 5 are mounted so as to be axially fixed in a direction parallel to the longitudinal axis of the shaft 2.

In a manner that is characteristic of the invention, the device 1 has a first configuration in which the shaft 2 and the stator 4 are disposed so as to be axially fixed the one relative to the other independently of the rotation movement of the rotor 5, that is to say including in the state with the rotor 5 driven in rotation. The device 1 further has a second configuration in which the shaft 2 and the stator 4 are, as a function of the rotation movement of the rotor 5, mounted so as to be the one mobile axially relative to the other in a direction parallel to the longitudinal axis of the shaft 2 to go from an axial relative position between the stator 4 and the shaft 2 to another axial relative position between the stator 4 and the shaft 2, each axial relative position between the stator 4 and the shaft 2 being a stable position, that is to say one maintained after driving rotation of the motor stops, including with the motor and the whole of the device 1 not supplied with electricity, or maintained after deactivation of the activatable/deactivatable system for immobilizing the element in rotation to be described hereinafter.

The first and second configurations are selectively activatable. The rotor 5 is a versatile rotor with the function of a drive unit driving rotation of said shaft 2 in the first configuration and the function of a drive unit driving axial relative displacement of the shaft 2 and of the stator 4 in the second configuration, said axial relative displacement being a function of the sense of rotation of the rotor.

The device 1 further comprises at least one element threaded onto the shaft 2. This element, represented at 71 or 72 in the figures, is a rotary element mounted so as to be constrained to rotate with the shaft 2 at least in the first configuration. This rotary element 71 or 72 is further mounted so as to be fixed in rotation in the second configuration and the shaft 2 and the element 71, 72 are mounted so as to be mobile axially the one relative to the other in the second configuration.

To enable this fixed in rotation mounting of the element 71 or 72 in the second configuration, the device 1 comprises an activatable/deactivatable system 9 for immobilizing the element 71 or 72 in rotation relative to the stator 4. The first configuration of the device 1 corresponds to the configuration in which the activatable/deactivatable system 9 for immobilizing the element 71 or 72 in rotation is in the deactivated state, and the second configuration of the device 1 corresponds to the configuration in which the activatable/deactivatable system 9 for immobilizing the element 71, 72 in rotation is in the activated state. The passage of the device 1 from the first configuration to the second is therefore effected by simple activation of the activatable/deactivatable system 9 for immobilizing the element 71 or 72 in rotation relative to the stator 4. The passage of the device 1 from the second configuration to the first is for its part effected by simple deactivation of the activatable/deactivatable system 9 for immobilizing the element 71 or 72 in rotation relative to the stator 4. In the activated state of the activatable/deactivatable system 9 for immobilizing the element in rotation the element represented at 72 in some embodiments and at 71 in other embodiments is immobilized in rotation. It therefore cannot turn about the shaft 2.

Independently of the design of the shaft 2, of the element 71 or 72 and of the rotor, the shaft 2 and the element 71 or 72 are mounted so as to be mobile axially, that is to say in a direction parallel to the longitudinal axis of the shaft 2, in the second configuration. The activatable/deactivatable system 9 for immobilizing the element 71 or 72 in rotation comprises at least one part 10 constrained to rotate with the element 71 or 72 and a part 11 independent of the element 71 or 72, this independent part being mounted on said stator. Said parts 10 and 11 are mobile in the sense of movement the one toward or away from the other and, in the activated state of the activatable/deactivatable system 9 for immobilizing the element 71, 72 in rotation, in a position with the one close to the other to assure, in the position with the one closer to the other, immobilization in rotation of the element 71 by friction contact.

In the examples represented in FIGS. 1 to 10, 12 and 15*a*, 15*b*, said parts 10 and 11 are mounted so as to be mobile axially in a direction parallel to the longitudinal axis of the shaft 2 upon passage from the deactivated state to the activated state of said activatable/deactivatable system 9 for immobilizing the element 71 or 72 in rotation, this displacement being effected in the sense of movement of said parts the one closer to the other.

Figure 11:
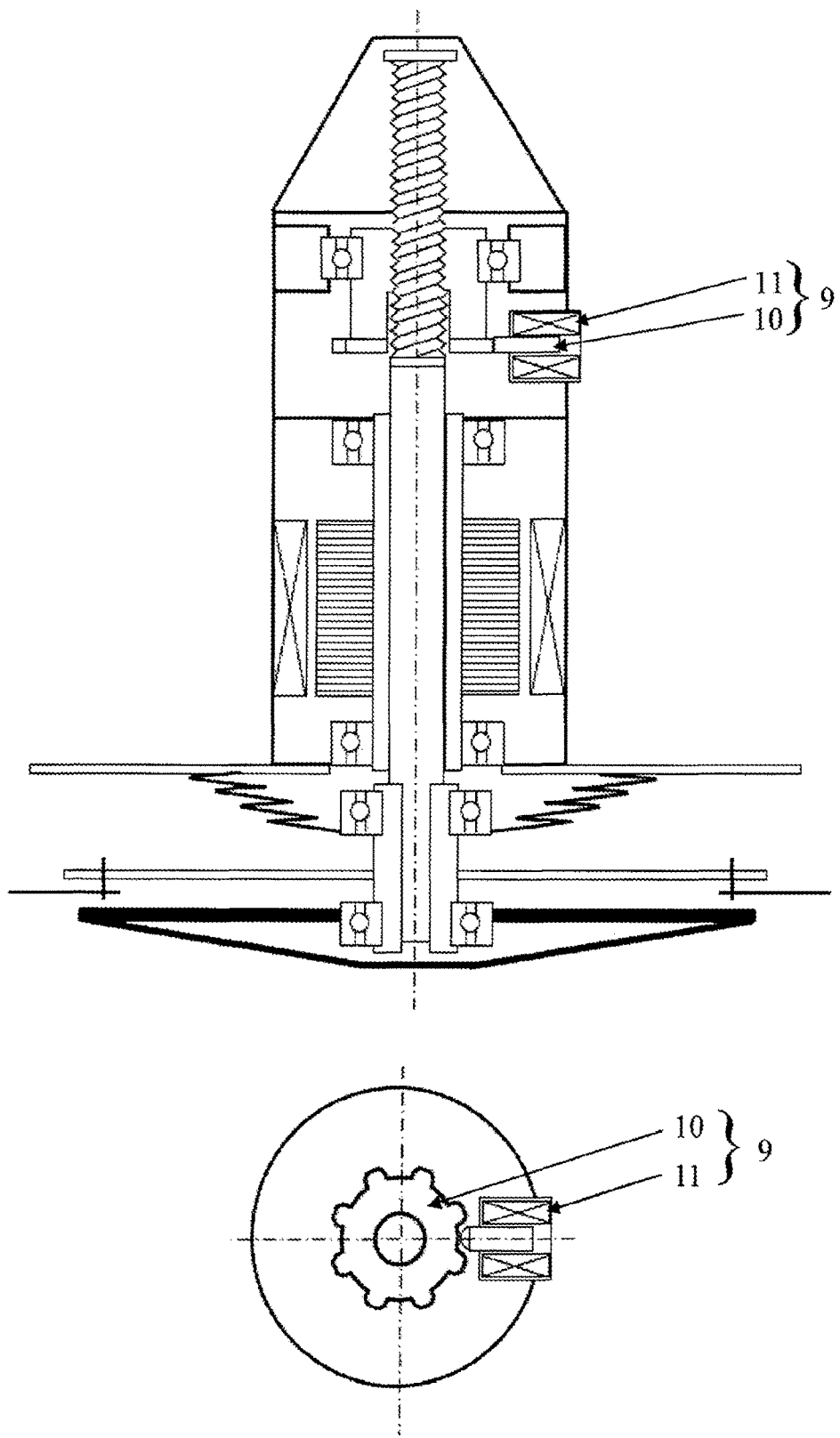
FIG. 11 represents, in the form of two sectional views associated with a detail view, variants of a device according to the invention for driving rotation of at least one shaft.

In the example represented in FIG. 11 the parts 10 and 11 are mounted so as to be mobile radially in a direction orthogonal to the longitudinal axis of the shaft 2 upon passage from the deactivated state to the activated state of said activatable/deactivatable system 9 for immobilizing the element in rotation, this displacement being effected in sense of movement of said parts the one closer to the other.

Figure 15A:
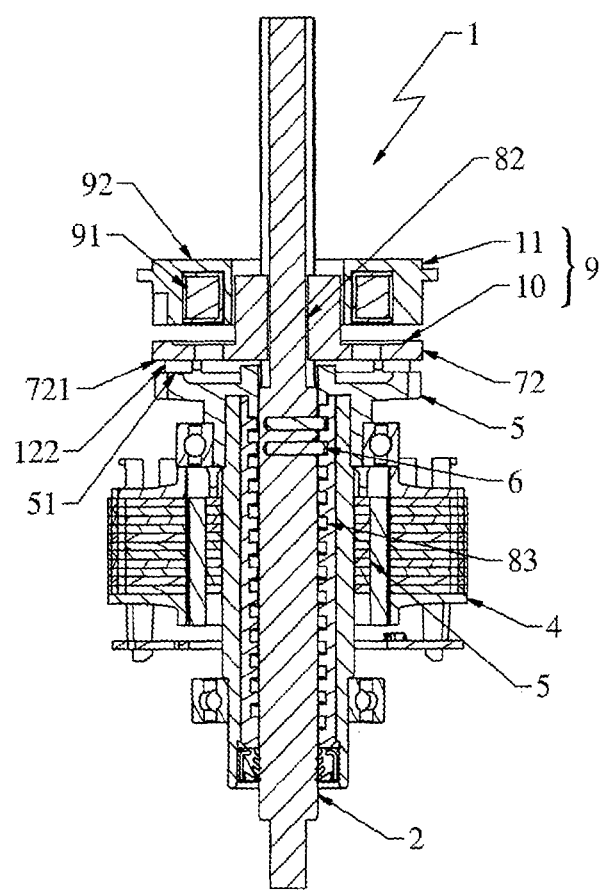
FIG. 15a represents a view of a driving device in the first configuration.
Figure 15B:
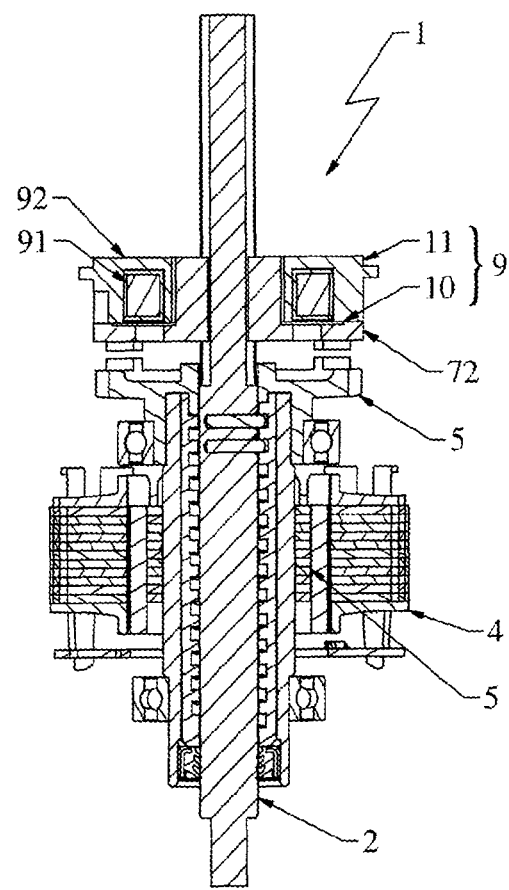
FIG. 15b represents a view of a driving device in the second configuration.

As depicted in the figures, for example in FIG. 2 or FIG. 15*a*, the activatable/deactivatable system 9 for immobilizing the element 71 or 72 in rotation is generally an electromagnetic system comprising at least a coil 91 and an armature 92 or a core. Said coil 91 may form at least partly one of the parts of the system 9 and the armature 92 or the core form at least partly the other of the parts of the system 9. Said parts are mounted so as to be mobile in the sense of movement of the one closer to or away from the other by the effect of activation or deactivation of the system 9. Activation and deactivation of the activatable/deactivatable system 9 for immobilizing the element 71 or 72 in rotation are effected by supplying electricity or interrupting the supply of electricity to at least one of the parts of the system 9. Thus such a system may be formed by a solenoid, an electromagnetic brake or some other system. The mobile part of the activatable/deactivatable system 9 for immobilizing the element 71 or 72 in rotation may further take the form of a mobile finger that is able to pass from one position to another in the activated state of the system 9 to interengage with a part of the system formed on the element 71 or 72.

In this embodiment, as depicted in FIG. 11, the part of the system 9 provided on the element may take the form of notches or of housings in which the finger forming the part of the system 9 independent of the element can be inserted in the active position of the system 9. The displacement of this finger may be radial, as depicted in FIG. 11. The part 11 of the system 9 independent of the element 71 or 72 may be mounted on the stator frame. This part 11 of the system 9 is mounted so as to be fixed in rotation relative to the shaft 2.

Independently of the design of the activatable/deactivatable system 9 for immobilizing the element in rotation, the element 71 or 72 may also take many forms. Examples are provided, one in FIG. 1 or FIG. 15a, the other in FIG. 6.

For its part the shaft 2 is a shaft a part of which represented at 6 in the figures is permanently interengaged with an internal thread 83 of the rotor 5 or an internal thread of the element threaded onto the shaft 2. In the example represented in FIGS. 1 to 5 and 15a, 15b the rotor 5 comprises an internal thread 83 permanently interengaged with the part 6 of the shaft 2.

In the example represented in FIGS. 1 to 5 this part 6 is formed by an external thread of the shaft 2 engaged with the internal thread 83 of the rotor 5. In the example represented in FIGS. 15a and 15b this part 6 is formed by a radial projection produced here by means of a pin on the shaft 2, this radial projection coming into interengagement with the internal thread 83 of the rotor 5. In the example from FIGS. 1 to 5 the rotor 5 has passed through it the shaft 2 that is screwed into the internally threaded through passage of the rotor 5. In the first or second configuration the internal thread 83 of the rotor 5 is in permanent interengagement with the part 6 in the form of an external thread of the shaft 2. For its part the element 72 is mounted so as to be constrained to rotate with the rotor 5 in the first configuration; this element 72 is, with the shaft 2, mounted so as to be fixed in rotation relative to the rotor 5 in the second configuration. The element 72 and the shaft 2 form an assembly in which they are constrained to rotate together in the first and second configurations. The element 72 therefore comprises longitudinal ribs 82 extending parallel to the longitudinal axis of the shaft 2, these ribs being inserted in grooves on the shaft 2. This assembly with the element 72 and the shaft 2 constrained to rotate together also enables mounting in an axially free manner in a direction parallel to the longitudinal axis of the shaft 2 of the element 72 and of the shaft 2.

In the examples represented in FIGS. 1 to 5 the system 9 and the element 72 are housed inside the stator frame of the motor that forms the casing of the device 1. The same applies in FIGS. 15a and 15b.

Figure 13:
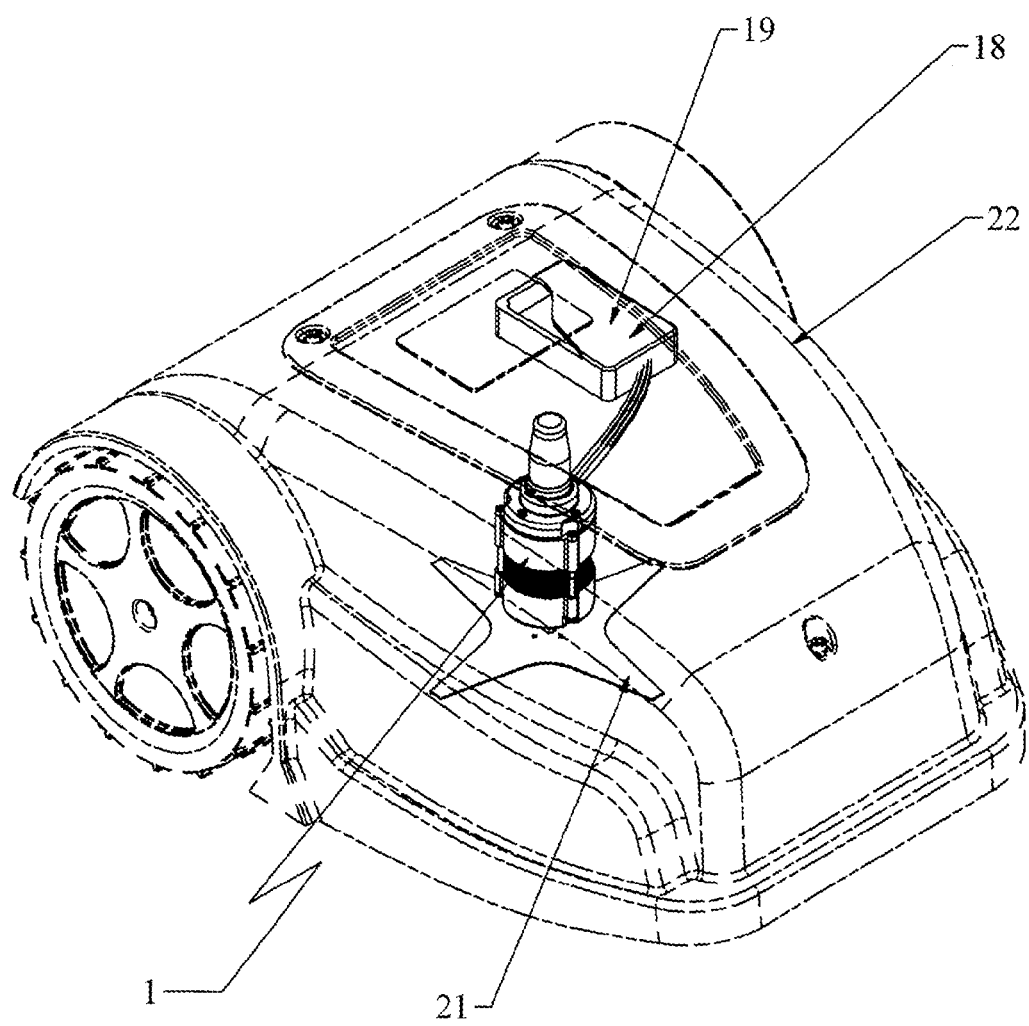
FIG. 13 represents a partial perspective view of a mobile machine equipped with a device according to the invention for driving rotation of at least one shaft.

In the examples represented in FIGS. 1 to 5 or 15a and 15b the element 72 takes the form of a ring with one face 721 facing the rotor 5. As mentioned hereinabove, the interior of the ring is provided with longitudinal ribs 82 interengaged with longitudinal grooves on the shaft 2 for an assembly of the element 72 and the shaft 2 constrained to rotate together independently of the (first or second) configuration of the device 1. The element 72 and the shaft 2 are therefore, by design, mounted so as to be permanently constrained to rotate together. In other words, the rotary element 72 is mounted so as to be constrained to rotate with the shaft 2 in the first configuration and in the second configuration. The element 72 and the shaft 2 can be displaced axially the one relative to the other, that is to say the shaft 2 and the element 72 are mobile axially in a direction parallel to the longitudinal axis of said shaft. Because of the aforementioned assembly, when the shaft 2 turns the element 72 turns. The face 721 of the ring constituting the element 72 has projecting or recessed parts 122 adapted to cooperate with parts 51 of complementary shape of the rotor 5 to form an assembly of the element 72 and of the rotor 5 mounted so as to be constrained to rotate together in the first configuration. In the example represented teeth 122 constituting projecting parts extend from the face of the ring to come to interengage with housings formed in the rotor 5 in the first configuration of the device 1. The element 72 is mobile axially in the sense away from the rotor 5, that is to say in a direction parallel to the longitudinal axis of the shaft 2, upon the passage of the activatable/deactivatable system 9 for immobilizing the element 72 in rotation from the deactivated state to the activated state to enable independent rotation of the rotor and of the shaft 2 in the second configuration. The element 72 therefore guarantees an assembly of the shaft 2 and of the rotor 5 such that they are constrained to rotate together in the first configuration with no possibility of angular offsetting of the shaft 2 screwed into the rotor 5 or permanently interengaged by its radial projection with the internal thread of the rotor 5. In the second configuration of the device 1, corresponding to the activated state of the activatable/deactivatable system 9 for immobilizing the element 72 in rotation, the element 72 is moved away from the rotor so that the rotor is able to turn while the shaft is maintained fixed in rotation by means of the element 72, itself immobilized in rotation by the activatable/deactivatable system 9 for immobilizing said element in rotation. With the element 72 moved away from the rotor 5 the recessed and projecting parts of the element 72 and of the rotor 5 no longer cooperate with each other. The result of this is that in this second configuration, when the rotor turns, the shaft screwed into the rotor or interengaged by its radial projection with an internal thread of the rotor is displaced axially, that is to say parallel to its longitudinal axis. When the shaft is equipped with a rotary working tool 21, such as a cutting tool, this cutting tool can therefore turn in the first configuration and be moved axially relative to the stator in the second configuration. If such a device 1 is mounted on a mobile machine 22, such as a robot lawnmower, as depicted in FIG. 13, or on a lawnmower, this device 1 for driving rotation of the shaft enables adjustment of the cutting height. When the mobile machine 22 is a lawnmower and the working tool 21 is a lawn mower blade, the device 1 for driving rotation of the shaft as described hereinabove therefore serves as a device for driving rotation of the working tool 21 in the first configuration and for adjusting the mowing height in the second configuration, these functions being obtained when the rotor is being driven in rotation. It is relatively unimportant whether the working tool 21 is coupled to the rotor 5 or to the shaft 2 of the device 1. When the mobile machine is a lawnmower, the device 1 for driving rotation of a shaft is of the aforementioned type and the working tool 21 coupled to the rotor or to the shaft 2 of the device 1 is a lawnmower blade, the driving device 1 therefore has the function of a device for adjustment of the mower cutting height in the second configuration and the function of a device for driving rotation of the lawnmower blade in the first configuration.

FIGS. 6 to 12 illustrate another embodiment of the element represented at 71 in said figures. In this embodiment the element 71 is a nut. This element 71 comprises an internal thread 81 permanently interengaged with a part 6 of the shaft 2 produced here in the form of an external thread on the shaft 2. The element 71 is therefore screwed onto the shaft 2. In this embodiment the rotor 5 and the shaft 2 are, directly or indirectly, permanently interengaged so as to be mounted so as to be constrained to rotate together and free to be displaced axially. The element 71 is axially fixed in a direction parallel to the longitudinal direction of the shaft 2 relative to the stator 4.

Figure 8:
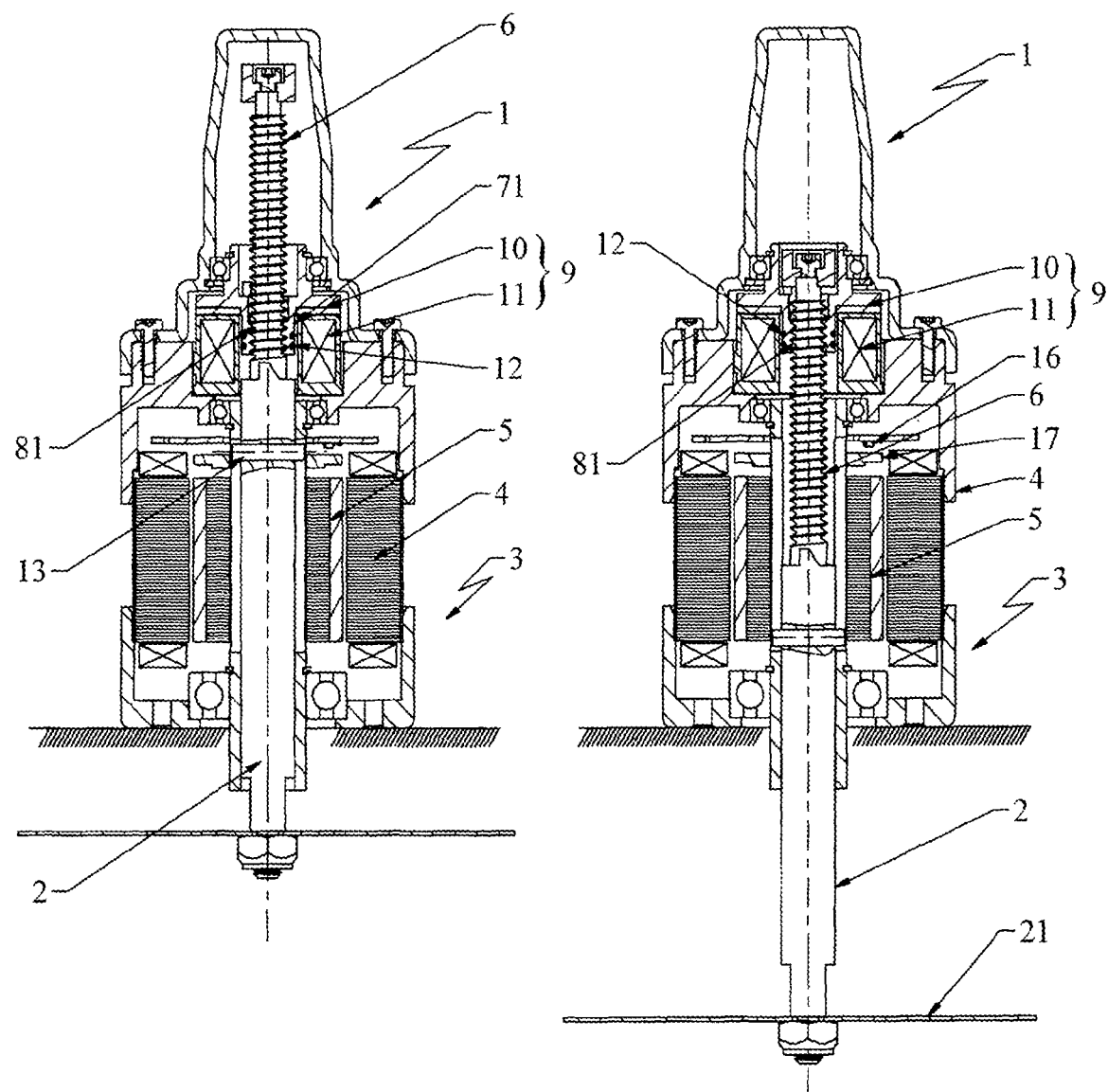
FIG. 8 represents two sectional views of the device for driving rotation of at least one shaft from FIG. 6 in the second configuration in two axial relative positions of the shaft and of the stator.

In the example from FIGS. 6 to 12 the means for assembly of the shaft 2 and of the rotor 5 that are mounted so as to be constrained to rotate together and free in axial displacement comprise a pin 13 connecting the rotor 5 and the shaft 2. This pin 13 passes through the shaft 2 and comes to be inserted in two diametrally opposed longitudinal grooves on the rotor 5, as depicted in FIG. 8. The element 71 and the shaft 2 are constrained to rotate together in the first configuration. In this first configuration, to prevent accidental unscrewing of the element 71 from said shaft 2 the element 71 is a so-called braked nut equipped with a brake 121 acting continuously on the nut. This brake is active through constriction and here takes the form of an elastic washer surrounding a radially deformable part of said nut. In fact, the nut is a nut that is partly deformable radially and the brake 121 of said nut is an element for constriction of said nut configured to generate internal radial deformation of the radially-deformable part of said nut. In the example represented this brake is formed of elastic washers around the radially-deformable part. Instead, the brake may equally take the form of a tension spring the two ends of which are connected to form a torus, where this torus is then mounted on the deformable part of the nut. The nut is also fixed axially relative to the stator in a direction parallel to the longitudinal axis of the shaft.

In this embodiment the device 1 further comprises an activatable/deactivatable system 9 for immobilizing the element 71 in rotation relative to the stator 4. The first configuration of the device 1 corresponds to the configuration in which the activatable/deactivatable system 9 for immobilizing the element 71 in rotation is in the deactivated state and the second configuration of the device 1 corresponds to the configuration in which the activatable/deactivatable system 9 for immobilizing the element 71 in rotation is in the activated state. The shaft 2 and the element 71 are therefore not constrained to rotate together in the second configuration and so the shaft 2, interengaged with the rotor, can turn independently of the element 71 in this second configuration.

In the examples represented the activatable/deactivatable system 9 for immobilizing the element 71 in rotation comprises a part 10 constrained to rotate with the element 71 and a part 11 independent of the element 71. This part 11 of the system 9 independent of the element 71 is at least partly mounted so as to be fixed relative to the stator 4. In the example from FIGS. 6 to 10 this part 11 of the system 9 independent of the element 71 extends around the shaft 2 and has the shaft 2 passed through it. This part 11 is mounted so as to be fixed in rotation relative to the shaft 2. The parts 10 and 11 are mounted so that on activation of the activatable/deactivatable system 9 for immobilizing the element 71 in rotation they are mobile in the sense of movement of the one closer to the other to assure, in the position of the one closer to the other, immobilization of the element 71 in rotation by friction contact. The parts 10 and 11 are therefore moved the one farther away from the other in the deactivated state of the system 9 and moved the one closer to the other in the activated state of the system 9.

This activatable/deactivatable system 9 for immobilizing the element 71 in rotation may be an electromagnetic system comprising at least a coil and an armature or a core. The coil and the armature may be formed, the one by the part of the activatable/deactivatable system 9 for immobilizing the element 71 in rotation secured to the element 71, the other by the part 11 of the activatable/deactivatable system 9 for immobilizing the element 71 in rotation mounted on the stator 4. Activation and deactivation of the system 9 are effected by supplying electricity or stopping supplying electricity to the coil.

Because of the design of the device 1 as described hereinabove in the second configuration with the rotor driven in rotation and the element 71 immobilized in rotation, the shaft and the stator undergo axial relative displacement.

Figure 12:
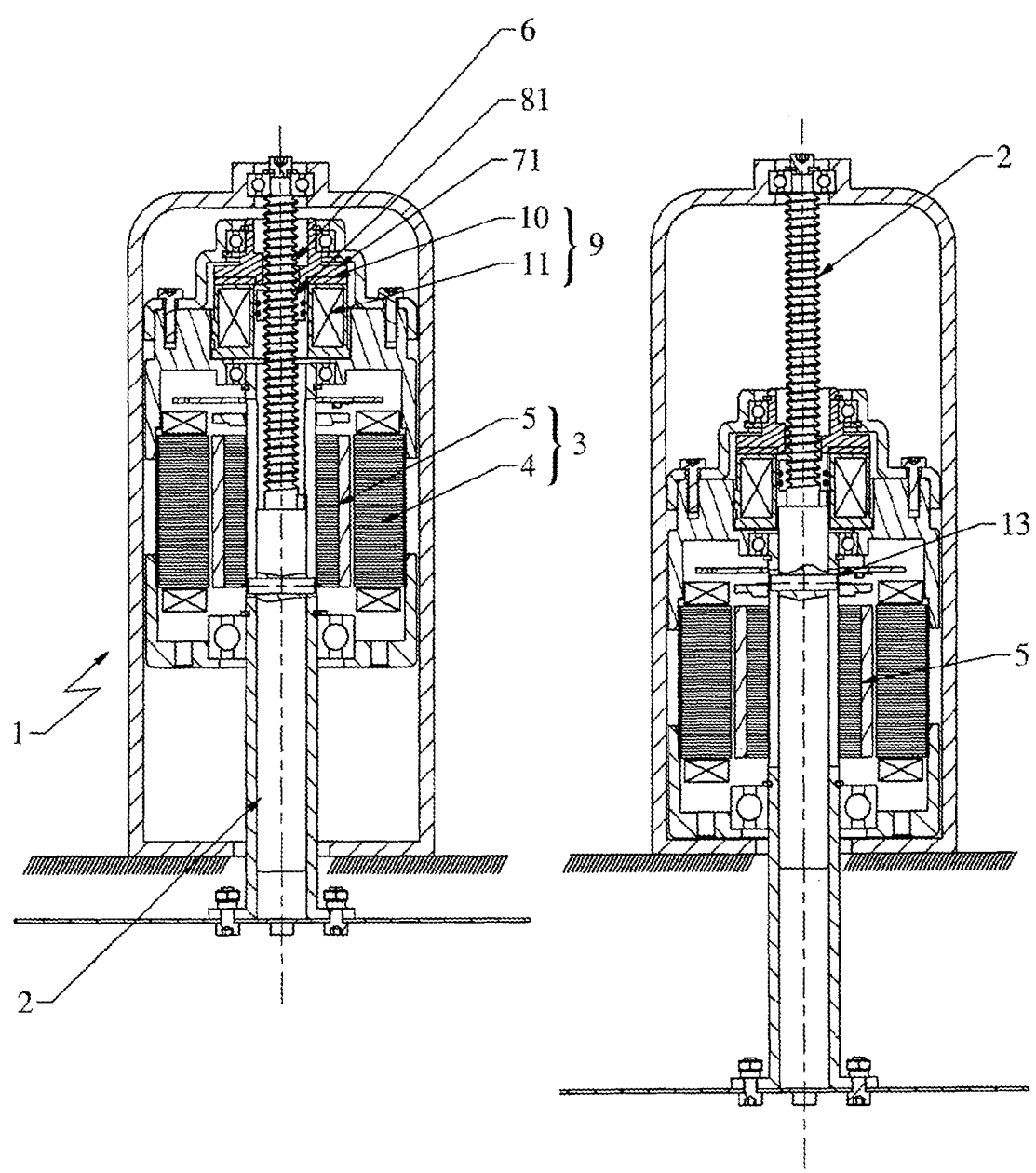
FIG. 12 represents two sectional views of a device according to the invention for driving rotation of at least one shaft in two different axial relative positions of the shaft and of the stator.

In the example represented in FIG. 8 it is the shaft 2 that is displaced axially, that is to say along its longitudinal axis. In this case the device 1 may be equipped with a working tool 21 coupled to the shaft 2. Conversely, in FIG. 12 in which the element 71 is also a nut, it is the stator/rotor assembly that is displaced axially, that is to say in a direction parallel to the longitudinal axis of the shaft relative to the shaft 2, which is axially fixed. In this embodiment, the working tool 21 is coupled to the rotor. The situation as depicted in FIG. 12, where it is the stator/rotor assembly that is displaced relative to the shaft, which is fixed, necessitates a supplementary casing surrounding at least a part of the motor and the shaft, the rotor projecting from this supplementary casing. Once again, such a device 1 as described hereinabove may be installed on a mobile machine 22, such as a lawnmower, on a power tool 20 or on some other mobile machine.

Independently of its embodiment, the device 1 comprises at least one or multiple end-of-travel abutments for the axial relative displacement of the shaft 2 and of the stator. These end-of-travel abutments are represented at 14 and 15 in the figures. The device generally comprises at least two end-of-travel abutments 14 and 15 for the axial relative displacement of the shaft 2 and of the stator 4. Said abutments 14, 15 are selectively active as a function of the sense of rotation of the rotor 5. These abutments may take many forms. These abutments may be produced in the form mechanical abutments as depicted in the figures. Thus each abutment may in the active state be in bearing contact with a part of the shaft. This abutment may be formed on the element or at a particular location on the stator. Said abutments are in the end-of-travel position of the shaft with one or the other in bearing contact with the shaft. The shaft comes to be driven in rotation in one sense butted against one of the abutments and driven in rotation in an opposite sense against the other abutment. In the example depicted in FIG. 2 the shaft has a washer disposed at the end of said shaft, this washer projecting radially from the body of the shaft. This washer comes to bear against the interior of the casing of the stator, thus forming a first abutment in a first end-of-travel position of the shaft and against the element 72, thus forming a second abutment in a second end-of-travel position of the shaft.

Figure 9:
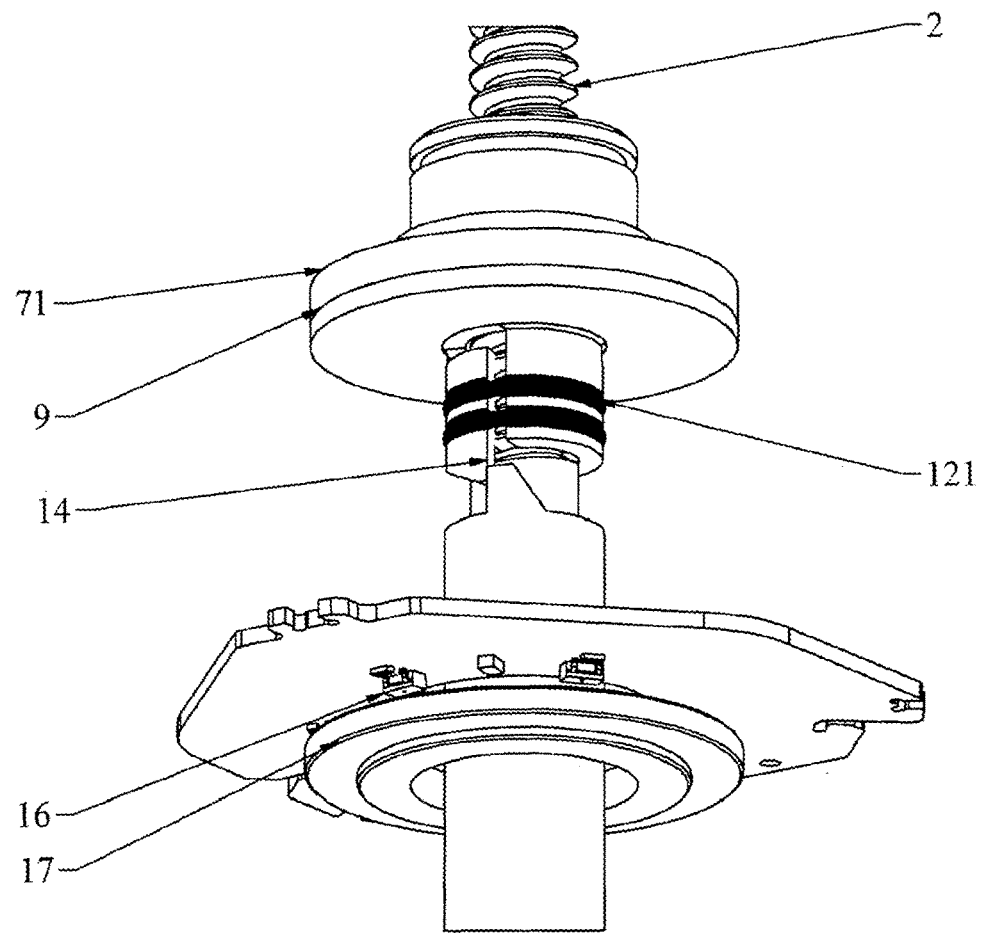
FIG. 9 represents a partial perspective view of the element in the form of a nut, of the rotor and of the shaft to depict in particular the continuously acting brake of the nut.
Figure 10:
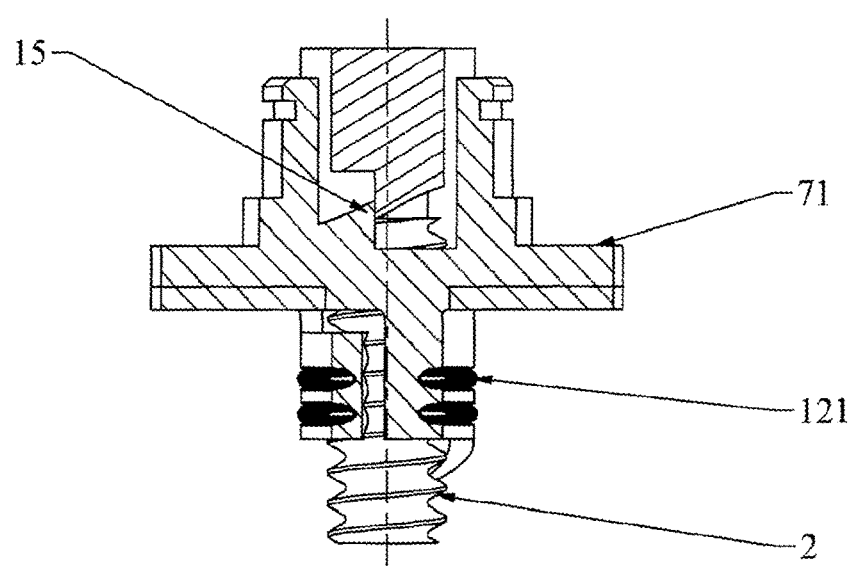
FIG. 10 represents a partial sectional view of the element in the form of a nut and of the shaft.

In the example represented in FIGS. 9 and 10 the abutments 14 and 15 are formed on the element 71 in a manner offset axially relative to the shaft on said element 71.

In the activated state of an end-of-travel abutment of the shaft a current peak may be detected and stored in a working memory 19 that will be described hereinafter.

Finally, independently of the embodiment of the device 1, the device 1 comprises at least a sensor 16 for detecting the angular position of the rotor 5 and a control unit 18 of the rotor 5. The sensor 16 for detecting the angular position of the rotor 5 may comprise a set of Hall effect sensors fixed on the stator and disposed in a circle facing a polarized disc 17 coaxial with the shaft 2 and detected by the sensors and constrained to rotate with the rotor.

The control unit 18 takes the form of an electronic and data processing system that comprises for example a microprocessor and a working memory 19. In accordance with one particular aspect the control unit 18 may take the form of a programmable automatic controller. In other words, the functions and steps described may be implemented in the form of a computer program or via hardware components (for example programmable gate arrays). In particular, the functions and steps performed by the control unit 18 or its modules may be implemented by sets of instructions or by data processing modules implemented in a processor or controller or by dedicated electronic components or FPGA or ASIC type components. It is also possible to combine data processing parts and electronic parts. When it is specified that the unit or means or modules of said control unit 18 are configured to perform a given operation, this means that the control unit 18 comprises computer instructions and corresponding execution means that enable said operation to be executed and/or that the control unit 18 comprises corresponding electronic components.

The control unit 18 is configured to acquire the data supplied by the sensor 16 for detecting the angular position of the rotor 5 to drive the rotor 5 with a view to predetermined axial relative positioning of the shaft 2 and of the stator 4 as a function at least of the data supplied by the sensor or sensors 16 for detecting the angular position of the rotor 5. In fact, the time for which the rotor is driven in rotation, the speed and the sense of rotation of the rotor make it possible to determine the axial relative displacement travel of the shaft and of the stator. The same sensor is therefore able to determine the angular position of the rotor and to assist with controlling the axial displacement travel of the shaft. The required axial displacement travel may be entered by the user into the control unit, for example via a human/machine interface, or stored. Moreover, the value of the pitch of the external thread of the shaft may be stored to control the axial displacement.

Figure 14:
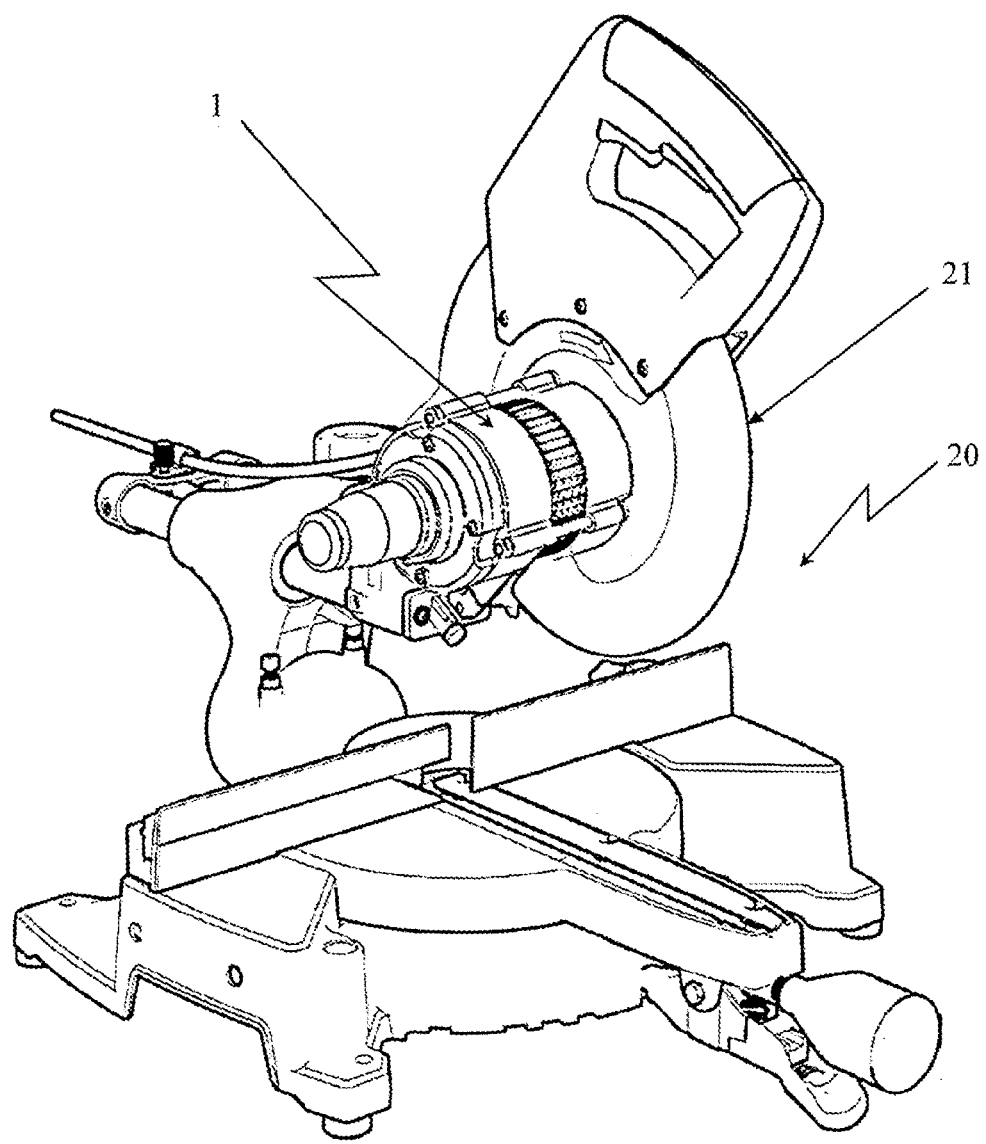
FIG. 14 represent a partial perspective view of a power tool equipped with a device according to the invention for driving rotation of at least one shaft.

As mentioned hereinabove the applications of such a device 1 for driving a shaft in rotation are diverse and varied. Such a device 1 may be integrated into a mobile machine 22, as depicted in FIG. 13, or into a power tool 20, as depicted in FIG. 14. When the mobile machine 22 is a lawnmower, this device 1 for driving rotation of the shaft 2 in which the shaft 2 or the rotor 5 is coupled to a working tool 21 formed by the lawnmower blade of said machine may be used, in addition to driving rotation of the cutting blade necessary for carrying out the cutting operation, to enable adjustment of the mowing height in the second configuration.

The functioning of a device 1 for driving rotation of a shaft as described hereinabove is as follows.

It is assumed that the activatable/deactivatable system 9 for immobilizing the element 71 or 72 in rotation relative to the stator 4 is deactivated. The device 1 is therefore in the first configuration. In this first configuration, in the example represented in FIGS. 1 to 5 or 15*a* and 15*b*, the element 72 is mounted so as to be constrained to rotate with and free to move axially on the shaft by cooperation of the ribs and grooves of the element and of the shaft. In this embodiment the element 72 is a ring threaded onto the shaft. In the first configuration this element 72 is also constrained to rotate with the rotor 5 by the parts 122 of the ring, the internal thread 83 of the rotor 5 itself being permanently interengaged with the shaft 2. Driving rotation of the rotor generates driving rotation of the shaft and of the element 72 with no possibility in this first configuration of the shaft becoming offset angularly relative to the rotor inside which it is disposed. In this first configuration the shaft 2 and the stator 4 are disposed with the one axially fixed relative to the other, including when the rotor 5 is driven in rotation.

In the example represented in FIGS. 6 to 12, in the first configuration in which the activatable/deactivatable system 9 for immobilizing the element 71 in rotation is deactivated, the shaft 2 and the stator 4 are disposed with the one axially fixed relative to the other, including when the rotor 5 is driven in rotation. The element 71, formed by a nut, is screwed onto the shaft 2 and turns with shaft 2 while the shaft 2 is mounted by keying or by means of a pin constrained to rotate with and free axially relative to the rotor. In this configuration, when the rotor is driven in rotation, the shaft 2, the element 71 and the rotor therefore turn together, the shaft 2 and the stator 4 being the one axially fixed relative to the other.

In the activated state of the activatable/deactivatable system 9 for immobilizing the element 71 or 72 in rotation the device 1 is in the second configuration. In the examples represented in FIGS. 1 to 5 or 15*a* and 15*b* activation of the system 9 leads to axial displacement of the element 72 in the sense of movement of the element 72 away from the rotor and movement of the element 72 closer to the independent part 11 of the element of the activatable/deactivatable system 9 for immobilizing said element in rotation. In this second configuration, in the example represented in FIGS. 1 to 5 and 15*a* and 15*b*, when the rotor is driven the shaft 2 is prevented from turning by the element 72 with which it is interengaged by the complementary groove/rib shapes, this element 72 being immobilized in rotation because of the activated state of the system 9. In this second configuration the element 72 is not constrained to rotate with the rotor 5. In particular, the parts 122 projecting from the face of the ring constituting the element 72 are moved away from the rotor so that the rotor is able to turn independently of the element 72. Because rotation of the shaft 2 is prevented, this results in axial displacement of the shaft 2 interengaged with an internal thread of the rotor by its external thread or its radial projection in the rotor when the rotor is driven in rotation. The axial displacement travel is a function of the data supplied by the sensor 16 for detecting the angular position of the rotor and comparison of that data with a travel control setpoint that can be entered by the user into the control unit, for example via a human/machine interface, or that may be stored. Moreover, the value of the pitch of the internal thread of the rotor may be stored to control the axial displacement. That displacement may continue until bearing contact with one of the end-of-travel abutments 14 or 15. This bearing contact is detected by an increase of current. In fact, when the rotor turns in the clockwise sense the shaft 2 is displaced axially in a first direction at most as far as one of its end-of-travel positions. When the rotor turns in the anticlockwise sense the shaft 2 is displaced axially in an opposite second direction at most as far as the other of its end-of-travel positions. Between these two end-of-travel positions, as soon as the rotor ceases to turn, the shaft ceased to be displaced axially and occupies a stable position relative to the stator.

In the example from FIGS. 6 to 11, in the activated state of the activatable/deactivatable system 9 for immobilizing the element 71 in rotation the element 71 which is screwed onto the shaft is immobilized in rotation and fixed axially relative to the stator. For its part the shaft 2 is constrained to rotate with and mobile axially relative to the rotor 5. Driving rotation of the rotor 5 therefore drives rotation of the shaft 2 and axial displacement of the shaft by cooperation of the external thread of the shaft with the internal thread of the nut constituting the element 71. When the rotor turns in the clockwise sense the shaft 2 is displaced axially in a first direction at most as far as one of its end-of-travel positions. When the rotor turns in the anticlockwise sense the shaft 2 is displaced axially in an opposite second direction at most as far as the other of the end-of-travel positions. Between these two end-of-travel positions, as soon as the rotor ceases to turn, the shaft ceases to be displaced axially and occupies a stable position relative to the stator.

In FIG. 12 the functioning is similar to FIGS. 6 to 11 except that it is not the shaft 2 that is displaced axially relative to the rotor/stator assembly and the element 71 but the rotor/stator assembly and the element 71 that are displaced axially relative to the shaft, that is to say along an axis parallel to the longitudinal axis of the shaft. In this embodiment a supplementary casing is provided to accommodate the shaft 2, the electric motor 3 and the other components of the device 1. The shaft is axially fixed relative to said casing and it is the remainder of the device that is displaced axially along said shaft 2 when the rotor is driven in rotation. Note that part of the rotor projects out of the casing, this projecting part of the rotor being equipped with the working tool 21.

The invention claimed is:

1. A device for driving rotation of at least one shaft, this driving device comprising in addition to said shaft an electric motor comprising a stator and single rotor with two senses of rotation, the rotor for driving rotation of said shaft having said shaft passed through it, said device comprising:
a first configuration in which the shaft and the stator are disposed with the one disposed axially fixed relative to the other when the rotor is driven in rotation, and
a second configuration in which, as a function of the rotation movement of the rotor, the shaft and the stator are mounted so as to be one mobile axially relative to the other in a direction parallel to the longitudinal axis of the shaft to pass from one axial relative position between the stator and the shaft to another axial relative position between the stator and the shaft,
each axial relative position between the stator and the shaft being a stable position, in that said first and second configurations are selectively activatable and in that the rotor is a versatile rotor with the function of a drive unit driving rotation of said shaft in the first configuration and the function of a drive unit driving axial relative displacement of the shaft and of the stator in the second configuration, said axial relative displacement being a function of the sense of rotation of the rotor,
wherein the device further comprises at least one rotary element being mounted so as to be constrained to rotate with the shaft at least in the first configuration and mounted so as to be fixed in rotation in the second configuration, and in that the shaft and the rotary element are mounted so as to be mobile axially the one relative to the other in the second configuration.

2. The device as claimed in claim 1 for driving rotation of at least one shaft, wherein said device comprises an activatable/deactivatable system for immobilizing said element in rotation relative to the stator, in that the first configuration of the device corresponds to the configuration in which the activatable/deactivatable system for immobilizing the element in rotation is in the deactivated state, and in that the second configuration of the device corresponds to the configuration in which the activatable/deactivatable system for immobilizing the element in rotation is in the activated state and so the element is immobilized in rotation relative to the stator.

3. The device as claimed in claim 2 for driving rotation of at least one shaft, wherein the activatable/deactivatable system for immobilizing the element in rotation comprises at least a part constrained to rotate with the element and a part independent of the element, said parts being mounted so as to be mobile in the sense of movement of the one closer to or farther from the other and in a position with the one closer to the other in the activated state of the activatable/deactivatable system for immobilizing the element in rotation.

4. The device as claimed in claim 3 for driving rotation of at least one shaft, wherein the activatable/deactivatable system for immobilizing the element in rotation is an electromagnetic system comprising at least a coil and an armature or a core.

5. The device as claimed in claim 1 for driving rotation of at least one shaft, wherein the element and/or the rotor comprise(s) an internal thread permanently interengaged with a part of the shaft.

6. The device as claimed in claim 5 for driving rotation of at least one shaft, of the type in which the rotor comprises an internal thread permanently interengaged with a part of the shaft, the element is mounted so as to be constrained to rotate with the rotor in a first configuration and in that the element, with the shaft, is fixed in rotation relative to the rotor in the second configuration.

7. The device as claimed in claim 6 for driving rotation of at least one shaft, wherein the element takes the form of a ring with one face facing the rotor, this face featuring projecting or recessed parts adapted to cooperate with parts of complementary shape of the rotor to constrain the element and the rotor to rotate together in the first configuration, this element being mounted so as to be mobile axially relative to the rotor on passage of the activatable/deactivatable system for immobilizing the element in rotation from the deactivated state to the activated state.

8. The device as claimed in claim 5 for driving rotation of at least one shaft, of the type in which the element comprises an internal thread permanently interengaged with a part of the shaft, wherein the rotor and the shaft are permanently interengaged either directly or indirectly so as to be constrained to rotate together and free for axial displacement and in that the element is mounted so as to be axially fixed relative to stator in a direction parallel to the longitudinal axis of the shaft.

9. The device as claimed in claim 8 for driving rotation of at least one shaft, wherein the element is a so-called braked nut equipped with a brake acting continuously on the nut.

10. The device as claimed in claim 1 for driving rotation of at least one shaft, wherein said device comprises one or more end-of-travel abutments for the axial relative movement of the shaft and of the stator.

11. The device as claimed in claim 10 for driving rotation of at least one shaft, wherein, the device comprising a plurality of, namely at least two, end-of-travel abutments for the axial relative movement of the shaft and of the stator, said abutments are selectively activatable as a function of the sense of rotation of the rotor.

12. The device as claimed in claim 1 for driving rotation of at least one shaft, characterized in that it wherein said device comprises at least one sensor for detecting the angular position of the rotor and a control unit of the rotor, in that the control unit is configured to acquire the data supplied by the sensor or sensors for detecting the angular position of the rotor and to drive the rotor with a view to predetermined axial relative positioning of the shaft and of the stator as a function at least of the data supplied by the sensor or sensors for detecting the angular position of the rotor.

13. The device as claimed in claim 1 for driving rotation of at least one shaft, wherein said device comprises a working tool and in that the working tool is coupled to the rotor or to the shaft of said device.

14. A power tool comprising a device for driving rotation of a shaft, wherein the device for driving rotation of a shaft, which comprises a working tool coupled to the rotor or to the shaft of said device as claimed in claim 1.

15. A mobile machine comprising a device for driving rotation of a shaft, wherein the device for driving rotation of a shaft, which comprises a working tool coupled to the rotor or to the shaft of said device as claimed in claim 1.

\* \* \* \* \*